May 1, 1928.                                                    1,668,404
F. E. HOLLEN
SEPARATOR AND PLATE HOLDER
Filed April 30, 1926

Frank E. Hollen
INVENTOR
BY Victor J. Evans
ATTORNEY

WITNESS:

Patented May 1, 1928.

1,668,404

UNITED STATES PATENT OFFICE.

FRANK E. HOLLEN, OF CHIPPEWA FALLS, WISCONSIN.

SEPARATOR AND PLATE HOLDER.

Application filed April 30, 1926. Serial No. 105,830.

This invention relates to holders for encasing the lead plates of wet cell batteries to serve as spacers to prevent the respective positive and negative plates from touching in the shorting of a battery.

The holders provide apertured portions upon their opposite sides through which the chemical action or electrolyte may pass backwards and forwards in the creation and formation of electrical energy.

A further object of the invention is to prevent the accumulation and falling off of lead oxide crystals, thereby deteriorating the plates creating a sediment within the cells of the battery and preventing the plates from holding the proper charge.

With the above and other objects in view, the invention further includes the following novel features and details of construction, to be hereinafter more fully described, illustrated in the accompanying drawing and pointed out in the appended claim.

Figure 1:
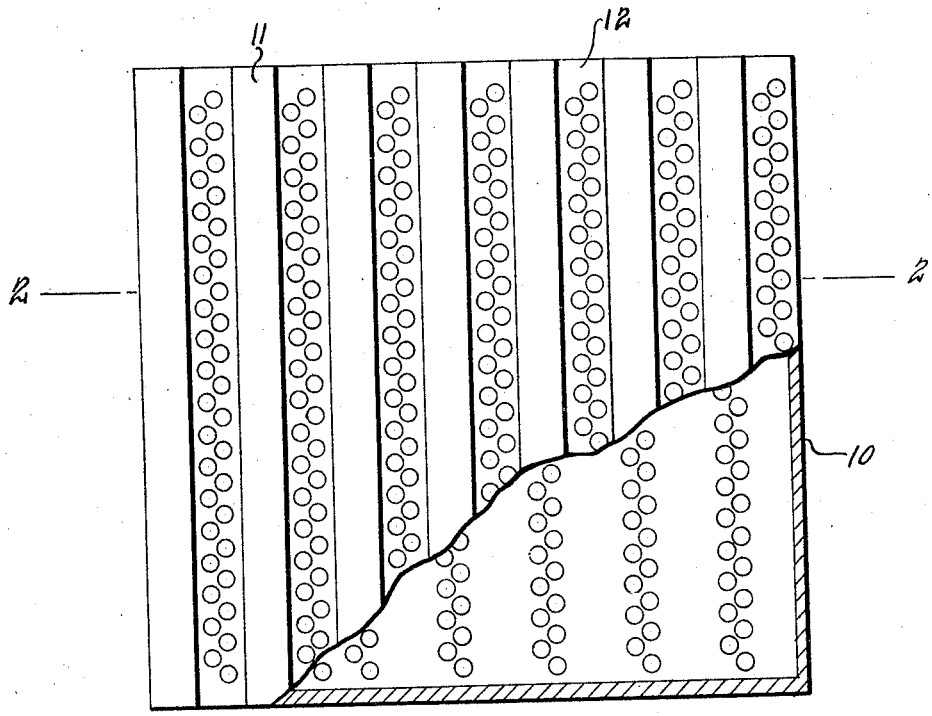
Figure 1 is an elevation of the invention partly broken away and illustrating the construction thereof.
Figure 2:
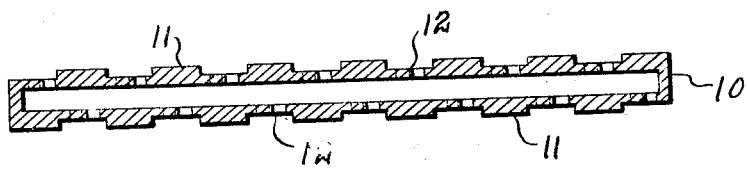
Figure 2 is a sectional view taken on the line 2—2 of Figure 1.

Referring to the drawing in detail wherein like characters of reference denote corresponding parts throughout the several views, the character 10 indicates a substantially flat box like housing or compartment formed of insulating or dielectric material, such as hard rubber and the like. The housing has defined upon the opposite side walls thereof enlarged spaced parallel rib portions 11 defining channel portions therebetween. Such channel portions being foraminated to permit the chemical action to take place within and between each of the positive and negative plates.

The holder defines a compartment to snugly receive a plate therein and to prevent its deterioration and forming of lead oxide crystals thereon. The enlarged rib portions 11 and channel portions 12 respectively being alternately arranged upon the opposite side walls of the holder and in staggered relation and designed for interfitting engagement with the corresponding companion portions of an opposing holder. The necessary chemical action of the elcetrolyte within the battery may pass to and from the respective plates through openings or foraminations in the ribs and channel portions to create the necessary electrical energy.

It is manifest that the invention may be equally and effectually as well applied to wet cell batteries used in house lighting units, motor vehicle batteries and radio batteries.

The invention is susceptible of various changes in its form, proportions and minor details of construction, and the right is herein reserved to make such changes as properly fall within the scope of the appended claim.

Having thus described my invention what I desire to claim as new is:

In a battery construction, a plurality of plate holders, each holder consisting of a box like structure adapted to wholly receive a plate, ribs carried in parallelism upon the side walls of the holders defining channels therebetween and disposed in staggered relation upon the opposite sides thereof, the ribs and channels upon companion holders being adapted for interfitting engagement and arranged in slight spaced relation, and the channels of the holders being apertured to permit the necessary chemical action to take place between companion plates.

In testimony whereof I affix my signature.

FRANK E. HOLLEN.